Sept. 15, 1936.  E. G. MAYER  2,054,586
STRIP FEED GUIDE
Filed Aug. 21, 1933
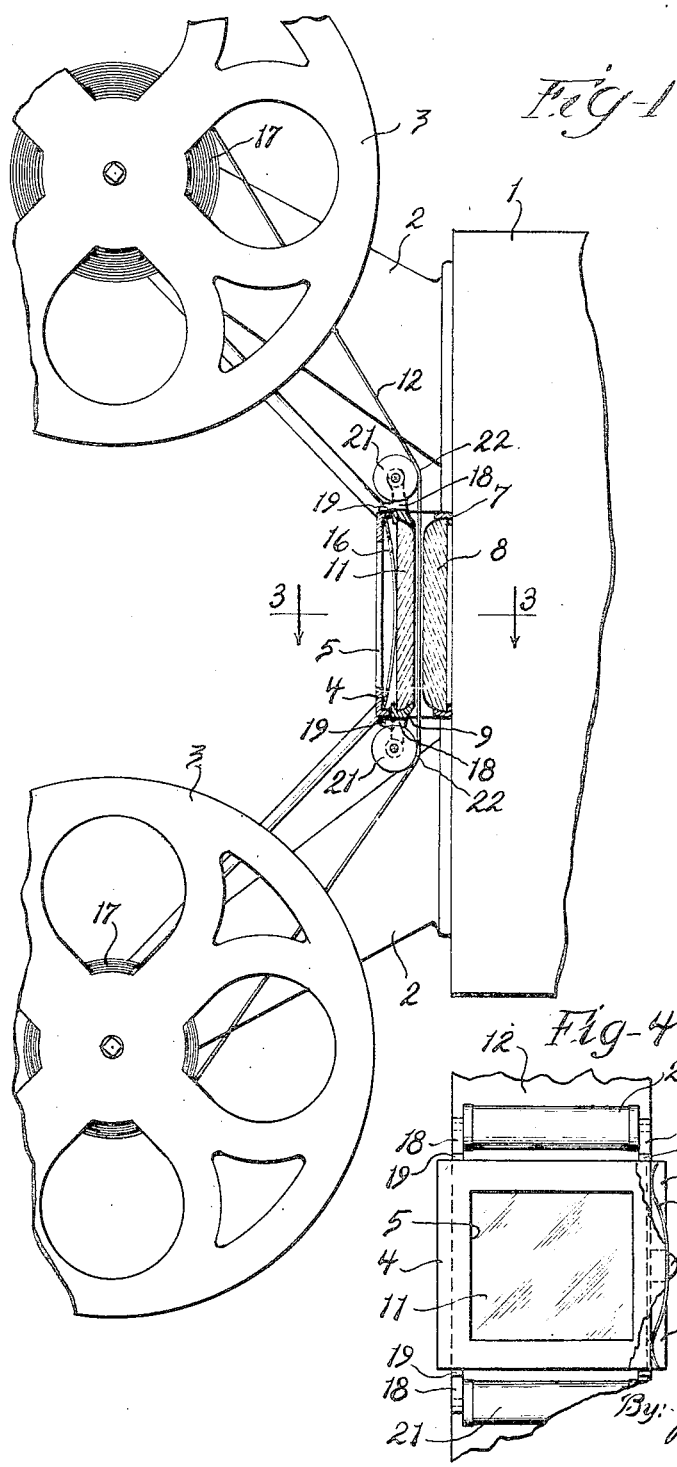
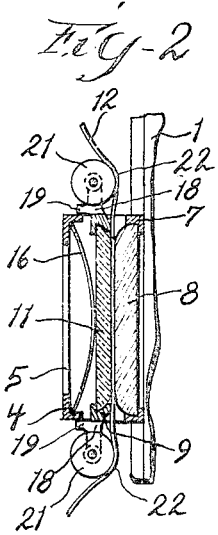
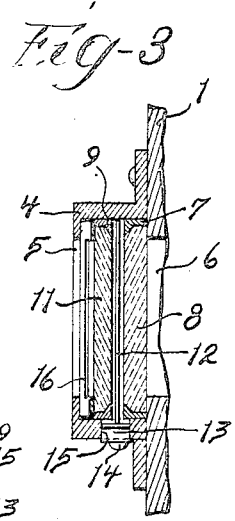
Inventor,
Edwin G. Mayer,
By: Robert F. Miehle Jr.
Atty.

Patented Sept. 15, 1936

2,054,586

UNITED STATES PATENT OFFICE 2,054,586

STRIP FEED GUIDE

Edwin G. Mayer, Chicago, Ill., assignor to The Bell & Howell Company, Chicago, Ill., a corporation of Illinois Application August 21, 1933, Serial No. 685,988

4 Claims. (Cl. 271—2.3)

My invention relates particularly to a strip feed exposure guide for photographic film strip projecting machines although not limited to this use alone.

One object of the invention resides in the provision of a strip feed guide through which a strip is fed at will and which automatically separates the face guide members of the guide during the feeding of the strip and which preferably disengages the strip from both face guide members during the feeding of the strip.

A further object of the invention resides in the provision of a photographic film strip projection guide wherein the opposing face guide members are formed of transparent material for projection, thus providing a continuous support of the film throughout the projected area thereof, means being provided for the feeding of the film through the guide without injury thereto.

With these objects in view my invention consists in certain features of novelty in the construction, combination and arrangement of parts by which the said objects are effected, all as fully described with reference to the accompanying drawing and more particularly pointed out in the appended claims.

In the said drawing—

Figure 1 is a partial side elevation of a photographic film strip developing machine embodying my invention and having a portion shown in section;

Figure 2 is a partial section in similar elevation;

Figure 3 is a partial section taken on the line 3—3 of Figure 1; and

Figure 4 is a partial front elevation of the device.

Like characters of reference indicate like parts in the several views.

Referring to the drawing, 1 designates the main casing of a photographic film strip projecting machine which is provided with vertically spaced forwardly projecting arms 2, at the outer ends of which vertically spaced film reels 3 are mounted for rotation in a usual manner. See Figure 1.

Arranged intermediately on the front wall of the casing 1, is a film strip guide which consists as follows:

A rectangular box frame 4 is secured on the front wall of the casing 1, and is provided with a front opening 5 alined with an opening 6 through the front wall of the casing 1 and through which projecting light passes from a source of light, not shown, within the casing. See Figures 1 and 3.

Suitably mounted, as designated at 7, within the frame 4 adjacent the front wall of the casing 1, is a stationary rear film strip guide plate 8 which is made of transparent material, such as glass for the transmission of the projecting light therethrough.

Arranged within the frame 4 in front of the plate 8, is a rectangular marginal frame 9 within which is mounted a front film strip guide plate 11 of transparent material, such as glass, for the projection of the projecting light therethrough, the frame 9 being movable forwardly and rearwardly relative to the frame 4 for positioning the guide plate 11 in separated relation with the guide plate 8 or in adjacent relation therewith.

The top and bottom walls of the frame 4 are provided with openings for the passage therethrough of a film strip 12 extending between the face guide plates 8 and 11, and the film is guided edgewise between one vertical side wall of the frame 4 and a bow spring 13 secured intermediately, as designated at 14, on the opposite vertical side wall of the frame 4 and having its ends projecting in openings 15 in this side wall of the frame 4 and pressing against the adjacent edge of the film. See Figures 3 and 4.

A bow spring 16 of rectangular marginal form is disposed between the front wall of the frame 4 and the frame 9 and the guide plate 11 and yieldably urges the frame 9 and the guide plate 11 rearwardly to normally position the guide plates 8 and 11 in pressure engaging relation with the film strip 12 therebetween to form a continuous support for the film throughout the projected area thereof, thus maintaining the projected portion of the film strip flat.

The film strip 12 is fed through the guide between rolls 17 thereof on the reels 3, the reels being alternately rotated and controlled for feeding the film through the guide in either direction by means unnecessary to be described. See Figure 1.

The frame 9 is provided at its upper and lower ends with pairs of transversely spaced extensions 18, forwardly projecting lugs 19 of which slidably engage the upper and lower surfaces of the frame 4 to provide a vertical bearing for the frame 9 in its rearward and forward movement relative to the frame 4 and the rear guide plate 8.

Disposed immediately beyond the upper and lower ends of the guide are rollers 21 disposed transversely of the guide and extending between and rotatably mounted on the adjacent pairs of extensions 18.

The film strip 12 passing between the guide and the rolls 17 thereof on the reels 3 passes over the rollers 21 and forms bights thereon, as designated at 22, see Figures 1 and 2, so that as a reel 3 is rotated to feed the film through the guide the feeding tension on the film acts on the rollers 21 and moves them, the frame 9 and the front guide plate 11 forwardly against the influence of the spring 16, as shown in Figure 1, thus separating the guide plates 8 and 11 for the feeding of the film strip through the guide without pressure contact between the film strip and the guide plates.

Preferably the rollers are so disposed that, during the feeding of the film strip through the guide with the guide plates separated, as shown in Figure 1, the film strip is disengaged from both of the guide plates 8 and 11.

When the feeding of the film strip ceases the feeding tension on the film also ceases with the result that the spring 16 moves the frame 9 and guide plate 11 rearwardly to establish the pressure engagement between the film and the guide plates 8 and 11 for projection, as shown in Figure 2.

Having thus described my invention, I do not wish to be limited to the precise details described as changes may be readily made without departing from the spirit of my invention, but having thus described my invention, I claim as new and desire to secure by Letters Patent the following:

1. In a device of the character described the combination with a strip guide comprising opposing face guide members one of which is movable facewise with reference to the other, of means yieldably urging said movable face guide member toward the other face guide member, feeding means operative upon a strip engaged in said guide beyond an end of the guide and adapted to pull a strip therethrough, a movable bight forming member operatively connected with said movable face guide member and disposed so that the strip forms a bight thereover between said guide and said feeding means and adapted to be moved by the strip under longitudinal tension by said feeding means to separate said guide members.

2. In a device of the character described the combination with a strip guide comprising opposing face guide members one of which is movable facewise with reference to the other, of means yieldably urging said movable face guide member toward the other face guide member, feeding means operative upon a strip engaged in said guide beyond an end of the guide and adapted to pull a strip therethrough, a bight forming member carried with said movable face guide member in the region of said end of the guide and disposed so that the strip forms a bight thereover between said end of the guide and said feeding means and adapted to be moved by the strip under longitudinal tension by said feeding means to separate said guide members.

3. In a device of the character described the combination with a strip guide comprising opposing face guide members one of which is movable facewise with reference to the other, of means yieldably urging said movable face guide member toward the other face guide member, feeding means operative upon a strip engaged in said guide beyond both ends of the guide and adapted to pull a strip in either direction therethrough, two movable bight forming members operatively connected with said movable face guide member and disposed in the regions of opposite ends of the guide and so that the strip forms bights thereover between opposite ends of the guide and said feeding means and adapted to be moved by the strip under longitudinal tension by said feeding means in either direction of feed of the strip to separate said guide members.

4. In a device of the character described the combination with a strip guide comprising opposing face guide members one of which is movable facewise with reference to the other, of means yieldably urging said movable face guide member toward the other face guide member, two strip reels disposed to reel a strip engaged in said guide from opposite ends thereof, two bight forming members carried with said movable face guide member and disposed in the regions of opposite ends of the guide and so that the strip forms bights thereover between the ends of the guide and said strip reels and adapted to be moved by the strip under longitudinal tension by reeling movement of either of said strip reels to separate said guide members.

EDWIN G. MAYER.